(12) United States Patent
Tashiro

(10) Patent No.: US 6,248,385 B1
(45) Date of Patent: Jun. 19, 2001

(54) METHOD FOR CUTTING AND SHAPING FOOD PRODUCTS

(75) Inventor: Yasunori Tashiro, Utsunomiya (JP)

(73) Assignee: Rheon Automatic Machinery Co., Ltd. (JP)

( * ) Notice: Subject to any disclaimer, the term of this patent is extended or adjusted under 35 U.S.C. 154(b) by 0 days.

(21) Appl. No.: 09/566,464

(22) Filed: May 8, 2000

Related U.S. Application Data

(62) Division of application No. 09/283,599, filed on Apr. 1, 1999, now Pat. No. 6,174,154.

(30) Foreign Application Priority Data

Apr. 1, 1998 (JP) .................................................. 10-89066
Apr. 1, 1998 (JP) .................................................. 10-89067

(51) Int. Cl.[7] ............................... A21C 5/00; A21D 6/00
(52) U.S. Cl. ........................ 426/503; 426/283; 426/518
(58) Field of Search .................................... 426/496, 503, 426/512, 518, 283; 425/132, 142, 308, 466, 287; 83/932

(56) References Cited

U.S. PATENT DOCUMENTS

| | | | |
|---|---|---|---|
| 4,734,024 | 3/1988 | Tashiro | 425/132 |
| 4,767,305 * | 8/1988 | Tashiro | 426/503 |
| 4,794,009 * | 12/1988 | Dreisin | 426/283 |
| 5,098,273 | 3/1992 | Tashiro | 425/132 |
| 5,190,770 | 3/1993 | Tashiro | 425/132 |
| 5,223,277 | 6/1993 | Watanabe et al. | 425/132 |
| 5,558,896 | 9/1996 | Kobayashi | 426/516 |

FOREIGN PATENT DOCUMENTS

| | | |
|---|---|---|
| 0 478 135 A1 | 4/1992 | (EP) . |
| 0 824 865 A1 | 2/1998 | (EP) . |
| 0 832 562 A2 | 4/1998 | (EP) . |

* cited by examiner

*Primary Examiner*—George C. Yeung
(74) *Attorney, Agent, or Firm*—Brinks Hofer Gilson & Lione

(57) ABSTRACT

An apparatus and method are provided for cutting and shaping food products consisting of a filling and a crust from bar-shaped food material. This apparatus comprises shutter members, each having a cutting surface and a sliding surface, a holding member that bridges and holds two adjacent shutter members, shafts equidistantly disposed on an imaginary circle, and driving means for synchronously rotating shutter members in the horizontal direction by the rotation of shafts.

3 Claims, 10 Drawing Sheets

METHOD FOR CUTTING AND SHAPING FOOD PRODUCTS

This is a divisional of application Ser. No. 09/283,599, filed Apr. 1, 1999, now U.S. Pat. No. 6,174,154.

TECHNICAL FIELD

This invention relates to an apparatus and a method for continuously cutting and shaping food products, such as a bean-jam bun or bean-jam rice dumpling, from two-layered bar-shaped food material consisting of a filling and a crust.

PRIOR ART

As prior art, an apparatus for cutting and shaping food products by opening and closing a central opening surrounded by a shutter assembly, while feeding two-layered bar-shaped food material consisting of a filling and a crust to the central opening in the downward direction, is disclosed, e.g., in Japanese Patent Kokoku No. 5-53453. In it, the shutter assembly comprises six shutter members of an identical shape, and each shutter member has a cutting surface and two sliding surfaces, namely, the first sliding surface and the second sliding surface, that abut the cutting surface. The central opening is formed by parts of the cutting surface of each shutter member. The shutter assembly is held in a polygonal housing equipped with six inner guide surfaces. The shutter members are combined such that the first sliding surface is made to slide on the cutting surface of an adjacent shutter member, and the second sliding surface is made to slide on an inner guide surface of the housing. By moving a shutter member in the horizontal direction to open and close the central opening by a driving means, the adjacent shutter member is moved in the same direction, so as to open and close the central opening so that the food material passing therethrough can be cut and shaped.

However, this prior-art apparatus has problems in that each shutter member encased in the housing tends to expand and be clogged by heat generated during the cutting and shaping operation, which prevents each sliding surface from smoothly sliding. Thus, the six shutter members cannot smoothly move in the horizontal direction to open and close the central opening, and the effects of cutting and shaping food material are not attained.

The prior-art apparatus has another problem in that since the first sliding surface and the second sliding surface of each shutter member are made to slide on the cutting surface of an adjacent shutter member and a guide surface of the housing, respectively, the accuracy of the dimensions of all three surfaces, namely, a cutting surface and two sliding surfaces, needs to be very high. Thus, the processing cost becomes high.

SUMMARY OF INVENTION

To overcome these problems of the prior-art apparatus, this invention is provided.

One object of this invention is to provide an apparatus for continuously cutting and shaping a spherical food product from bar-shaped food material consisting of a filling and a crust by continuously opening and closing a central opening of a shutter assembly, while feeding the bar-shaped food material in a downward direction to the central opening, characterized by the shutter assembly comprising at least three shutter members positioned adjacent to each other in the circumferential direction, each shutter member having a convex cutting surface and concave sliding surface abutting each other, a top surface and bottom surface, the shutter members being so combined that one sliding surface of a shutter member slides on the cutting surface of an adjacent shutter member for opening and closing the central opening surrounded by the cutting surfaces, holding members, each bridging and holding two adjacent shutter members to guide one sliding surface of a shutter member along the cutting surface of an adjacent shutter member, a shaft fixedly mounted on each shutter member, equidistantly disposed on an imaginary circle such that each shutter member is moved in the horizontal direction for opening and closing the central opening by the rotation of the shaft, and driving means that synchronously moves every shutter member in the horizontal direction for opening and closing the central opening through the rotation of the shaft.

Another object of this invention is to provide an apparatus for continuously cutting and shaping from bar-shaped food material consisting of a filling and a crust a food product consisting of a filling and a crust, wherein the top part of the product is devoid of a crust so that the filling is exposed at its top, by continuously opening and closing a central opening of a shutter assembly, while feeding the bar-shaped food material in a downward direction to the central opening, characterized by the shutter assembly comprising at least three shutter members positioned adjacent to each other in the circumferential direction, each shutter member having a cutting surface and a sliding surface abutting each other, each cutting surface being shaped such that its bottom extends forwardly toward the central opening from its top, each sliding surface being shaped complementary to the cutting surface, an edge being provided at a tip of the bottom of each cutting surface, the shutter members being so combined that one sliding surface of a shutter member slides on the cutting surface of an adjacent shutter member for opening and closing the central opening surrounded by the cutting surfaces, holding members, each bridging and holding two adjacent shutter members to guide one sliding surface of a shutter member along the cutting surface of an adjacent shutter member, a shaft fixedly mounted on each shutter member, equidistantly disposed on an imaginary circle such that each shutter member is moved in the horizontal direction for opening and closing the central opening by the rotation of the shaft, and driving means that synchronously moves every shutter member in the horizontal direction for opening and closing the central opening through the rotation of the shaft.

Another object of this invention is to provide an apparatus for continuously cutting and shaping from bar-shaped food material consisting of a filling and a crust a food product consisting of a filling and a crust, wherein the bottom part of the product is devoid of a crust so that the filling is exposed at its bottom, by continuously opening and closing a central opening of a shutter assembly, while feeding the bar-shaped food material in a downward direction to the central opening, characterized by the shutter assembly comprising at least three shutter members positioned adjacent to each other in the circumferential direction, each shutter member having a cutting surface and a sliding surface abutting each other, each cutting surface being shaped such that its top extends forwardly toward the central opening from its bottom, each sliding surface being shaped complementary to the cutting surface, an edge being provided at a tip of the top of each cutting surface, the shutter members being so combined that one sliding surface of a shutter member slides on the cutting surface of an adjacent shutter member for opening and closing the central opening surrounded by the cutting surfaces, holding members, each bridging and holding two adjacent shutter members to guide one sliding surface of a shutter member along the cutting surface of an adjacent shutter member, a shaft fixedly mounted on each shutter member, equidistantly disposed on an imaginary circle such that each shutter member is moved in the horizontal direction for opening and closing the central opening by the rotation of the shaft, and driving means that synchronously moves every shutter member in the horizontal direction for opening and closing the central opening through the rotation of the shaft.

Another object of this invention is to provide a method for continuously cutting and shaping a spherical food product from bar-shaped food material consisting of a filling and a crust, comprising two steps, the first step comprising rotating synchronously at least three shutter members in the horizontal direction for closing a central opening through which the food material can pass until an indentation is formed by the gathering of parts of the shutter members at the top center thereof, and the second step comprising further rotating the shutter members in the same direction until the indentation formed at the top center of the shutter assembly disappears, thereby causing the top and the bottom center of the shutter assembly to become flat, a hollow section being formed in the center of the shutter assembly and between the top surface and the bottom surface of the shutter members.

Another object of this invention is to provide a method for continuously cutting and shaping, from bar-shaped food material consisting of a filling and a crust, a food product consisting of a filling and a crust, wherein the top part of the product is devoid of a crust so that the filling is exposed at its top, comprising two steps, the first step comprising rotating synchronously at least three shutter members in the horizontal direction for closing a central opening through which the food material can pass until an indentation is formed by the gathering of parts of the shutter members at the top center thereof, and the second step comprising further rotating the shutter members in the same direction until the indentation formed at the top center of the shutter assembly disappears, thereby causing the top center of the shutter assembly to become flat, and an indentation being formed at the bottom center of the shutter assembly.

Another object of this invention is to provide a method for continuously cutting and shaping, from bar-shaped food material consisting of a filling and a crust, a food product consisting of a filling and a crust, wherein the bottom part of the product is devoid of a crust so that the filling is exposed at its bottom, comprising two steps, the first step comprising rotating synchronously at least three shutter members in the horizontal direction for closing a central opening through which the food material can pass until an indentation is formed by the gathering of parts of the shutter members at the bottom center thereof, and the second step comprising further rotating the shutter members in the same direction until the indentation formed at the bottom center of the shutter assembly disappears, thereby causing the bottom center of the shutter assembly to become flat, and an indentation being formed at the top center of the shutter assembly.

Since this invention has no housing to hold the shutter assembly, the shutter assembly will not be clogged when the shutter members are expanded by heat generated during the cutting and shaping operation. Also, since in this invention the accuracy of the dimensions of two surfaces, namely, a cutting surface and a sliding surface of each shutter member, needs to be improved, the processing cost of this apparatus becomes low. Therefore, the disadvantages of the prior-art apparatuses have been overcome.

EXPLANATION OF THE PREFERRED EMBODIMENT

This invention will be explained below by reference to the attached drawings.

Figure 4:
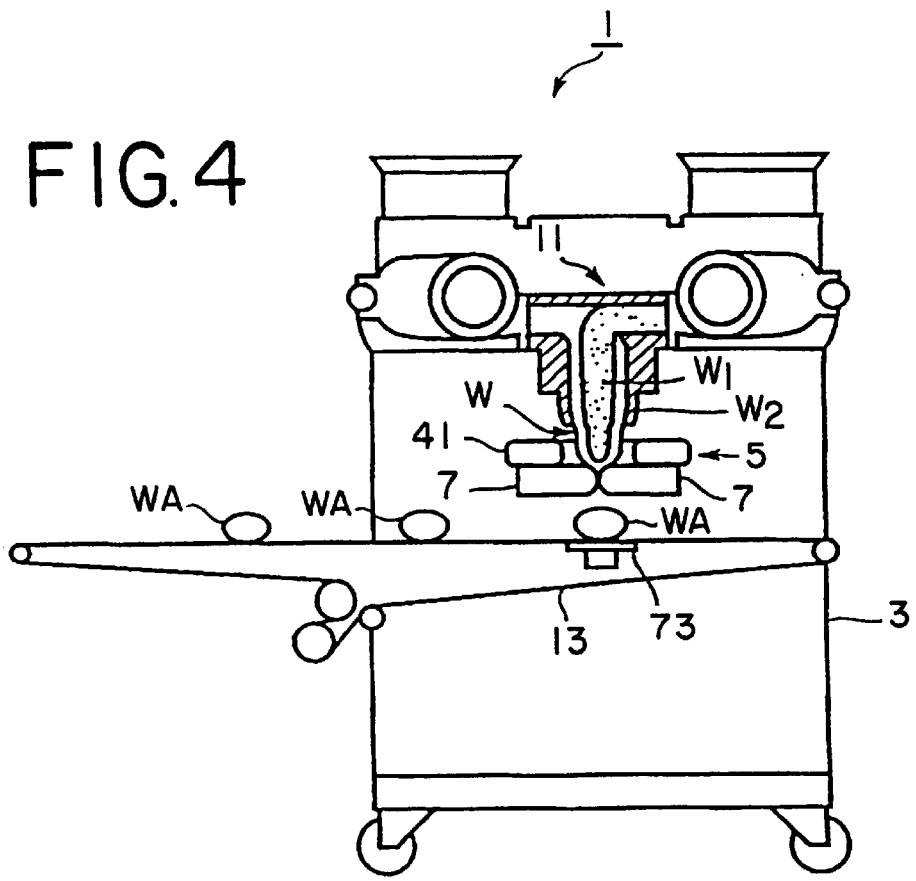
FIG. 4 is a schematic front view of the apparatus for cutting and shaping the bar-shaped food material, and the conveyor for food products.

FIG. 4 shows an entire apparatus for shaping and conveying food products 1. It continuously cuts and shapes food products WA from a two-layered bar-shaped food material W consisting of a filling W1 and a crust W2. Also, it feeds the food products WA in the feeding direction. It comprises a box-shaped frame 3, at the center of which an apparatus 5 for cutting and shaping food products is disposed. This apparatus 5 for cutting and shaping food products continuously cuts and shapes food products WA from the bar-shaped food material W by continuously opening and closing a central opening 9 at the center of a shutter assembly 7, while the bar-shaped food material W is fed in the downward direction to the central opening 9. An extruder 11 that feeds the food material W to the central opening 9 is disposed above the apparatus 5 for cutting and shaping food products. A conveyor 13 that feeds food products WA in the feeding direction is disposed under the apparatus 5 for cutting and shaping food products.

The apparatus 5 for cutting and shaping food products will now be explained in detail.

Figure 1A:
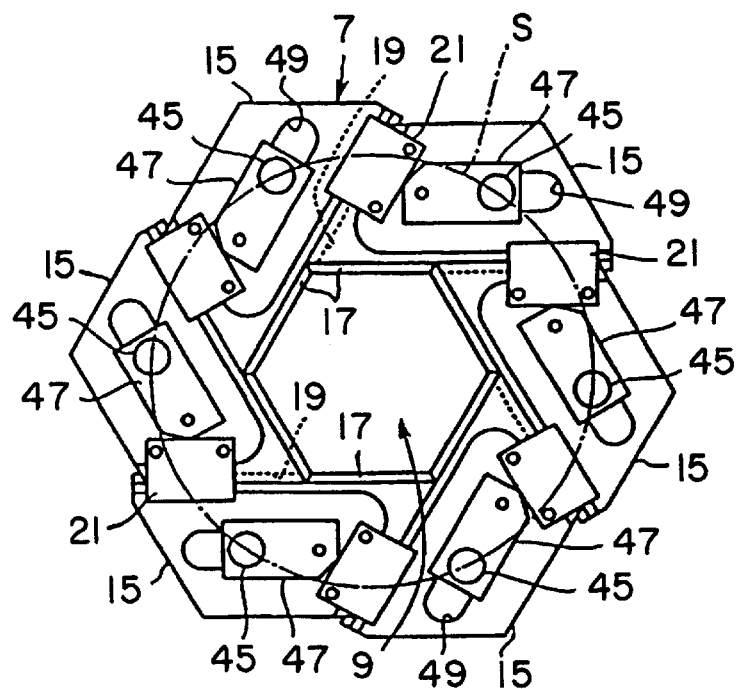
FIGS. 1(*a*) and 1(*b*) are plans showing the function of the shutter assembly.
Figure 1B:
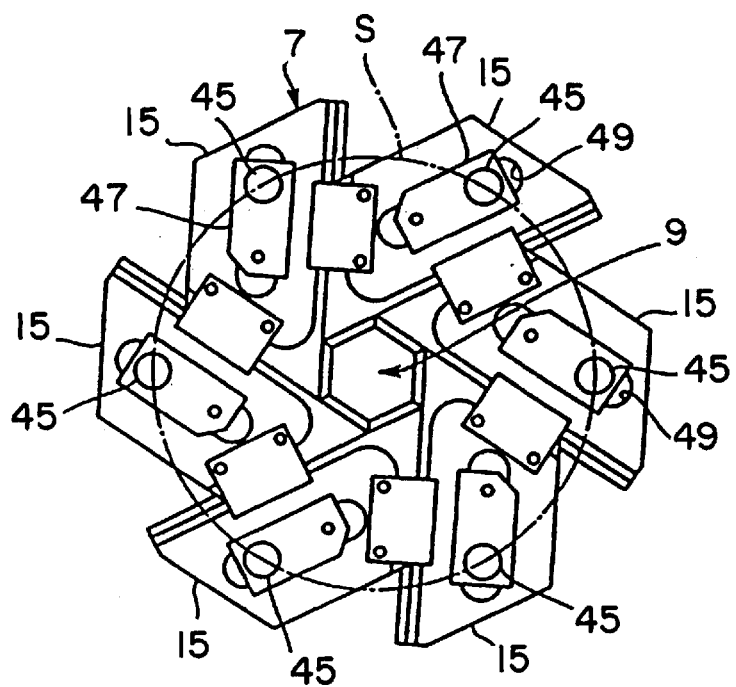

A first embodiment of this invention is to cut and shape a spherical food product consisting of a filling and a crust. As shown in FIGS. 1–3, the shutter assembly 7 is constituted by combining six shutter members 15 of an identical shape, each shutter member 15 having a convex cutting surface 17 and a concave sliding surface 19 that abut each other. The central opening 9 through which the food material W can pass is formed by parts of the cutting surfaces 17 of six shutter members 15. As shown in FIG. 3, each cutting surface 17 comprises a vertical section 17a projecting toward the central opening 9, a slant section 17b disposed above the vertical section 17a for pressing the filling W1 upward, and a slant section 17c disposed below the vertical surface 17a for pressing the filling W1 downward. Each sliding surface 19 also comprises a vertical section and two slant sections, each abutting the vertical section. The configuration of a sliding surface 19 is complementary with the cutting surface 17, so that a convex-concave engagement results between adjacent shutter members.

Each sliding surface 19 of the shutter member 15 is made to slide on the cutting surface 17 of the adjacent shutter member 15. Every adjacent shutter member 15 is bridged to be held by a holding member 21 so that the shutter members 15 are prevented from being separated during the cutting and shaping operation. While the bar-shaped food material W is fed in the downward direction to the central opening 9, six shutter members 15 are synchronously moved in the horizontal direction to close the central opening 9. As shown in FIGS. 7(a), 7(b), 8(a), and 8(b), the vertical section 17a gradually penetrates the food material W to cut the crust W2. Simultaneously, the slant section 17b pushes the filling W1 upward, while the slant section 17c pushes the filling W1 downward, so as to cut and form a spherical food product WA without exposing the filling W1. Thereby, a spherical food product WA, consisting of a crust W2 and a filling W1, can be cut and formed from the bar-shaped food material W.

Figure 9:
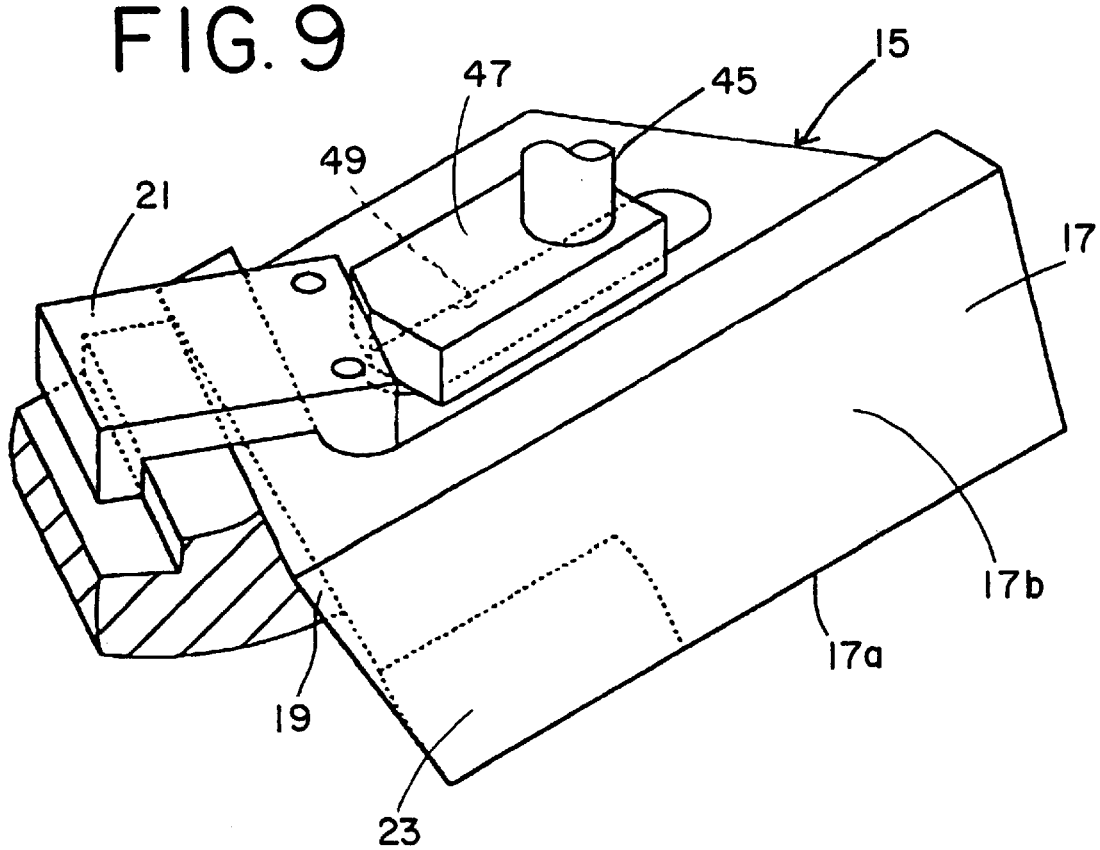
FIG. 9 is a perspective of a shutter member of the second embodiment.

A second embodiment of this invention is to cut and shape, from bar-shaped food material consisting of a filling and a crust, a food product consisting of a filling and a crust wherein the top part of the product is devoid of a crust so that the filling is exposed at its top. The shape of each shutter member in this embodiment (shown in FIG. 9) differs from that of the first embodiment (shown in FIG. 3). Each shutter member 15 comprises a cutting surface 17 and a sliding surface 19 that abut each other. Each cutting surface 17 is shaped such that its bottom extends forwardly toward the central opening from its top, and each sliding surface is shaped complementary to the cutting surface, so that each sliding surface can be engaged with each cutting surface. In this embodiment, an edge 17a is provided at the tip of the bottom of each cutting surface 17, for cutting the crust W2 before the central opening 9 is closed. Also, a joining member 17b is provided above the edge 17a for joining the crust of the food product cut by the edge 17a to form the bottom crust of the food product that will be cut and shaped next, while pushing the filling W1 upward. Also, a hollow 23 is provided at the bottom of each shutter member 15 near the edge 17a.

Figure 10A:
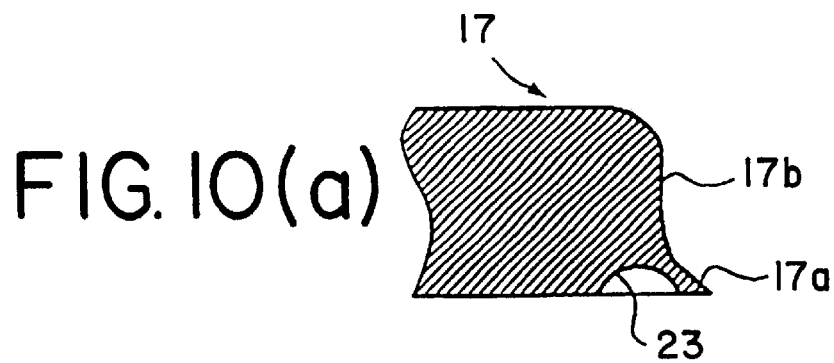
FIGS. 10(*a*) through 10(*e*) are exemplary plan views of cutting surfaces of the second embodiment.
Figure 10B:
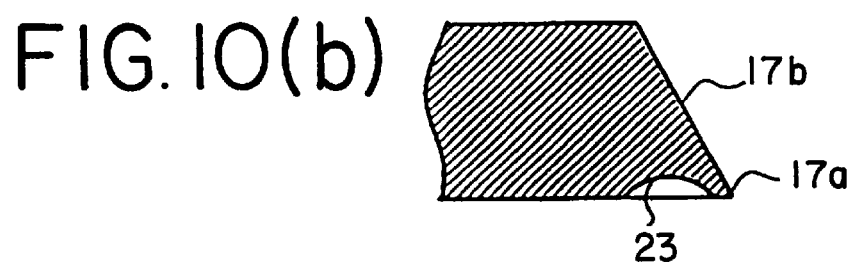
Figure 10C:
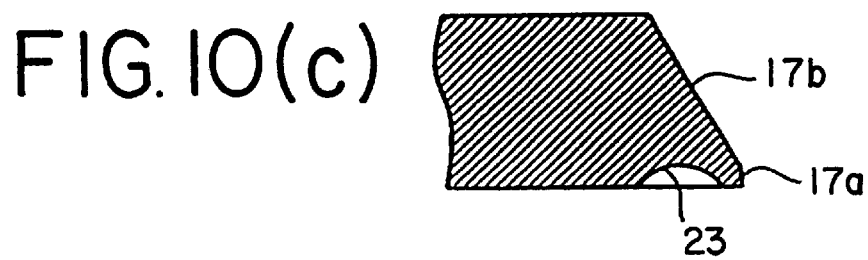
Figure 10D:
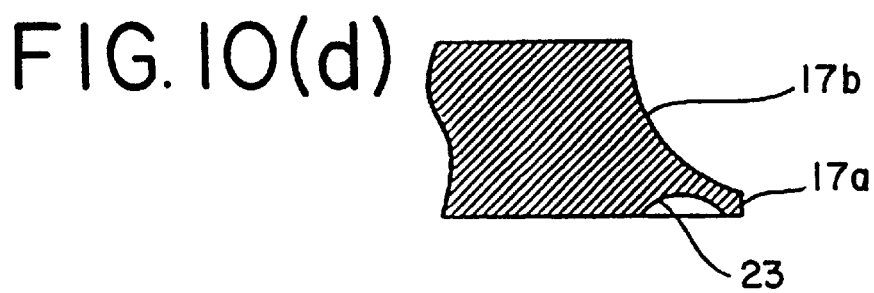
Figure 10E:
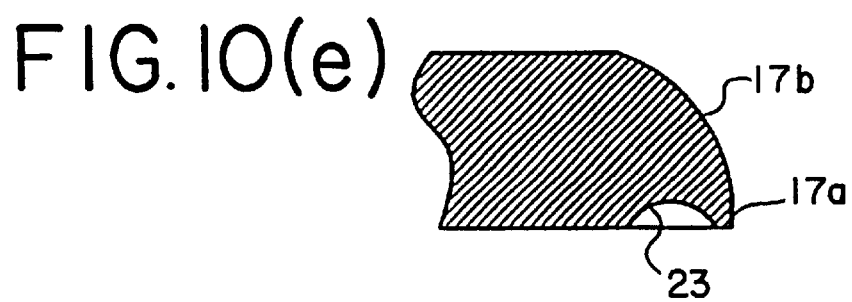

The edge 17a of each cutting surface 17 of FIGS. 10(a) and 10(b) intersects with the bottom of the shutter member 15 at acute angles. However, alternatively, as shown in FIGS. 10(c) and 10(d), the edge 17a of each cutting surface 17 can intersect with the bottom of the shutter member 15 at right angles. Also, the joining member 17b of each cutting surface 17 has an S-shaped surface as shown in FIG. 10(a). However, alternatively, the joining member 17b of each cutting surface 17 can be a straight surface as shown in FIGS. 10(b) and 10(c), or, it can be a concave curved surface as shown in FIG. 10(d), or, it can be a convex curved surface as shown in FIG. 10(e).

Figure 13A:
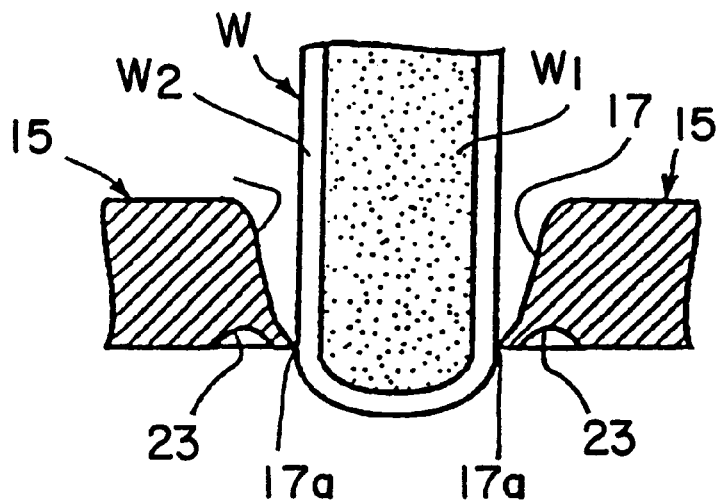
FIGS. 13(*a*) and 13(*b*) are plans showing the function of the shutter assembly in the second embodiment in the process of closing the central opening.
Figure 13B:
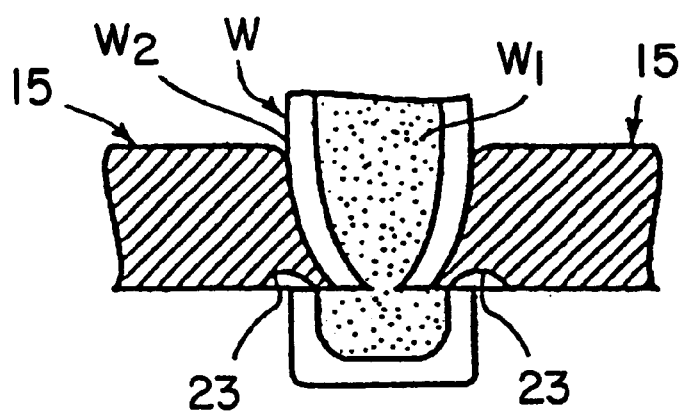
Figure 14A:
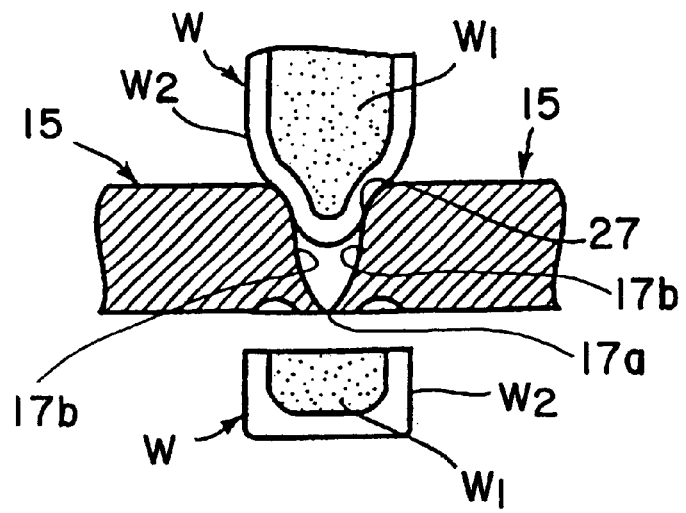
FIGS. 14(*a*) and 14(*b*) are plans showing the function of the shutter assembly in the second embodiment at the stage where the first step of closing is completed and where the second step is completed, respectively.
Figure 14B:
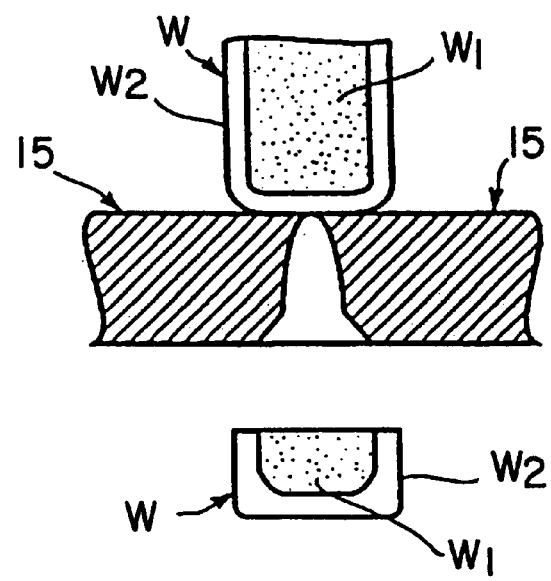

While the food material W is fed to the central opening 9 in the downward direction by means of the extruder 11, six shutter member 15 are synchronously moved in the horizontal direction to close the central opening 9. As shown in FIGS. 13(a) and 13(b), the edge 17a of each shutter member 15 gradually penetrates the food material W to cut the crust W2 before the central opening 9 is closed. As shown in FIG. 13(b), the lower part of the crust W2 that is cut by the edge 17a is positioned inside the hollow 23 so as that the lower part of the crust W2 is prevented from being dragged by the shutter members 15. As shown in FIGS. 14(a) and 14(b), the joining member 17b joins the crust part above the crust W2 of the food product WA cut by the edge 17a to form the bottom crust W2 of the next food product, while it pushes the filling W1 upward. Thereby, a food product WA wherein the filling W1 is exposed at its top can be cut and shaped from the bar-shaped food material W.

Figure 11:
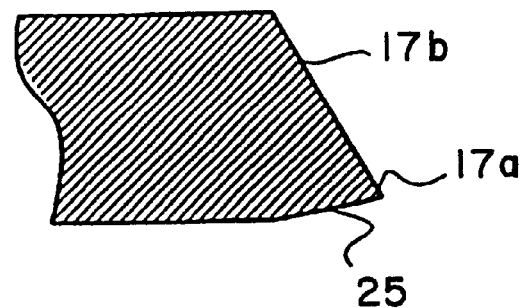
FIG. 11 is a plan of a cutting surface of the second embodiment.

In this embodiment, a hollow 23 is provided with each shutter member 15. However, alternatively, as shown in FIG. 11, it can have a gently slanted surface 25 below the edge 17a.

Figure 12A:
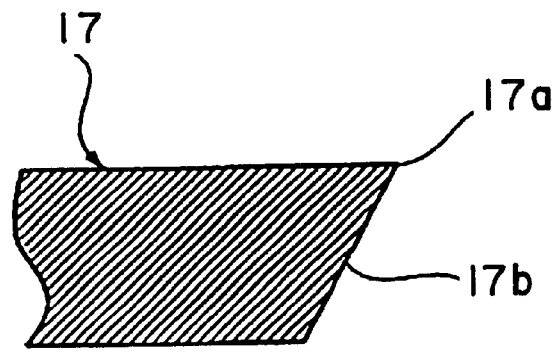
FIGS. 12(*a*) and 12(*b*) are plans showing cutting surfaces of the third embodiment.
Figure 12B:
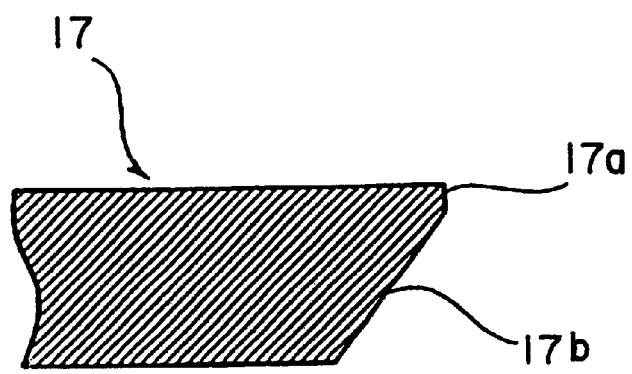

The third embodiment of this invention is to cut and form from bar-shaped food material consisting of a filling and a crust a food product consisting of a filling and a crust wherein the bottom part of the product is devoid of a crust so that the filling is exposed at its bottom. The cutting surface 17 of each shutter member 15 in this embodiment shown in FIG. 12 differs from that of the second embodiment shown in FIG. 10. An edge 17a is provided at a tip of the top of each cutting surface 17. Also, a joining member 17b is provided below an edge 17a for joining the crust part below the crust W2 of the food product WA cut by the edge 17a to form the top crust of the food product while pushing the filling W1 downward.

We will now explain the functions and effects of the two-step cutting and shaping operation of the shutter assembly 7 in the first embodiment by reference to FIGS. 2(a), 2(b), 8(a), and 8(b).

Figure 2A:
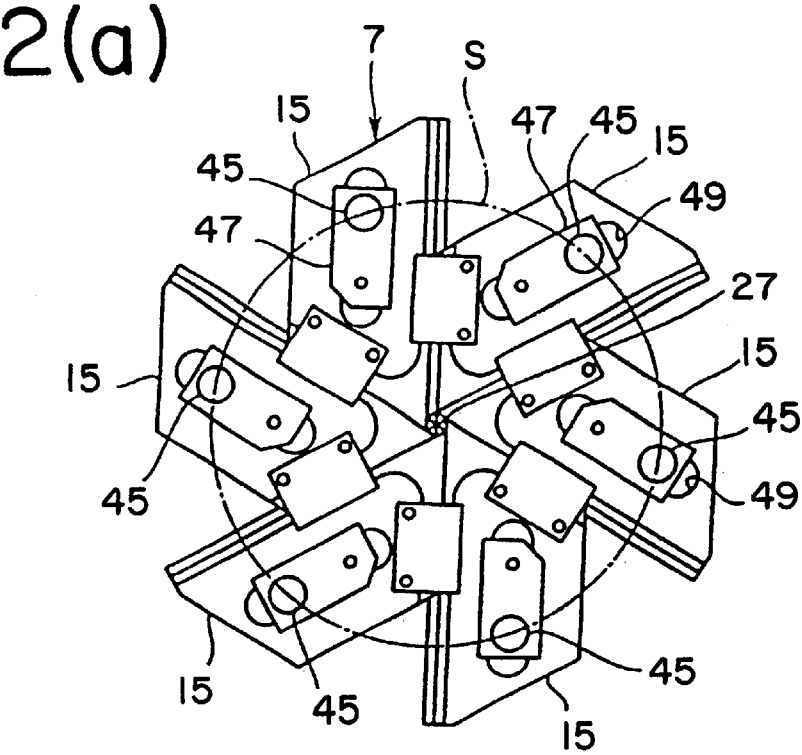
FIGS. 2(*a*) and 2(*b*) are plans showing the function of the shutter assembly.
Figure 2B:
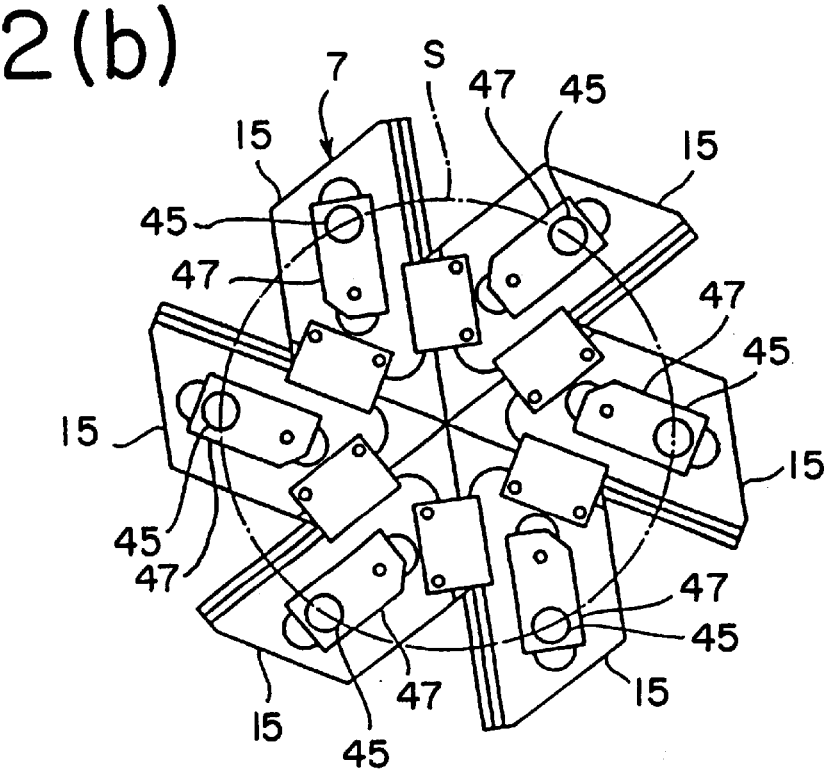
Figure 3:
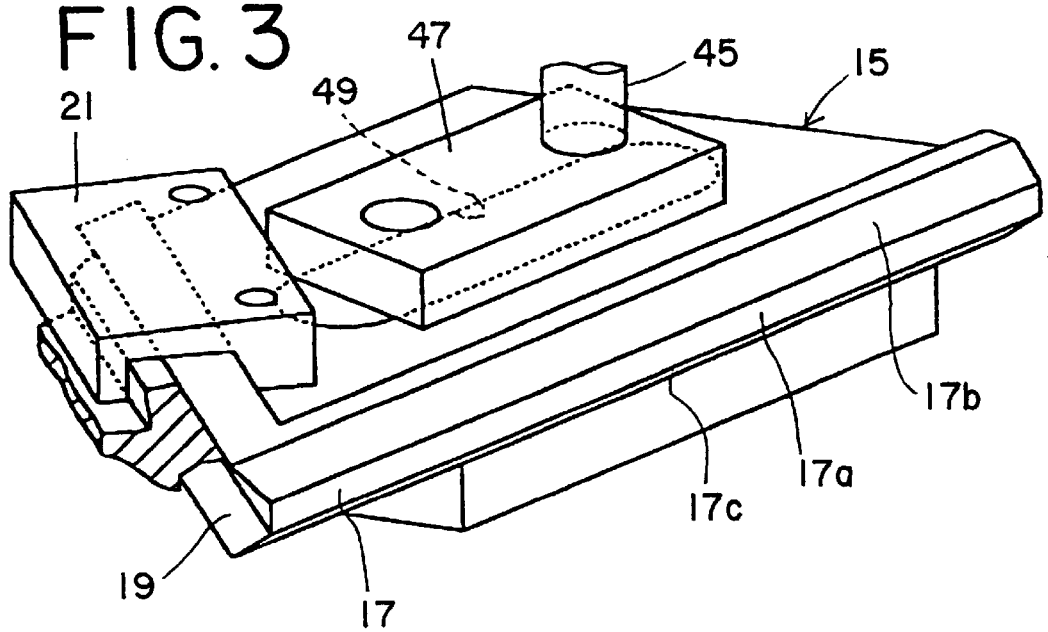
FIG. 3 is a perspective showing a shutter member of the first embodiment in detail.
Figure 8A:
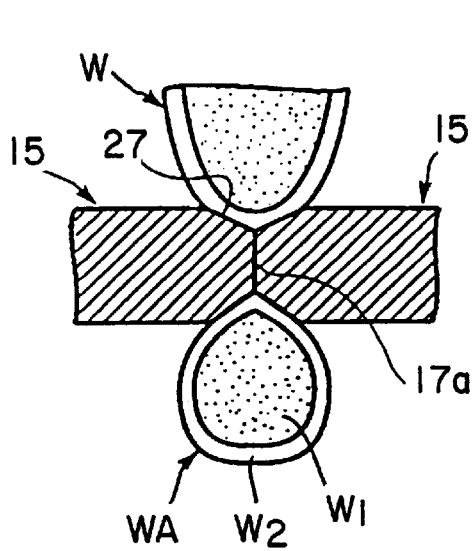
FIGS. 8(*a*) and 8(*b*) are plans showing the function of the shutter assembly in the first embodiment at the stage where the first step of closing is completed and where the second step is completed, respectively.
Figure 8B:
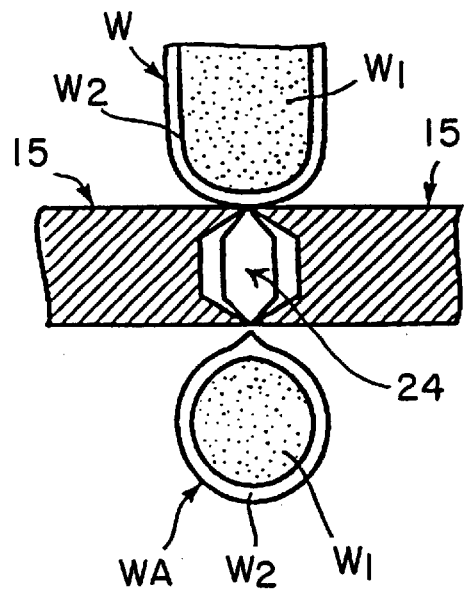

In a first step shown in FIGS. 2(a) and 8(a), six shutter members 15 are moved in the horizontal direction to close the central opening 9 until an indentation 27 is formed by the gathering of the vertical sections 17a of the cutting surfaces 17 of the shutter members 15 at the top center of the shutter assembly 7. Then, in a second step shown in FIGS. 2(b) and 8(b), six shutter members 15 are further moved in the same direction until the indentation 27 formed at the top center of the shutter assembly 7 disappears. Thereby, the top and the bottom center of the shutter assembly 7 become flat. Also, a hollow section 24 is formed in the center of the shutter assembly 7 and between the top surface and the bottom surface of the shutter members 15.

We will now explain the functions and effects of the two-step cutting and shaping operation of the shutter assembly 7 in the second embodiment by reference to FIGS. 2(a), 2(b), 14(a), and 14(b).

In a first step shown in FIGS. 2(a) and 14(a), six shutter members 15 are moved in the horizontal direction to close the central opening 9 until an indentation 27 is formed by the edges 17a of the cutting surfaces 17 of the shutter members 15 at the top center of the shutter assembly 7. Then, in a second step shown in FIGS. 2(b) and 14(b), six shutter members 15 are further moved in the same direction until the indentation 27 formed at the top center of the shutter assembly 7 disappears. Thereby, the top center of the shutter assembly 7 becomes flat. Also, an indentation is formed at the bottom center of the shutter assembly 7.

We will now explain the functions and effects of the two-step cutting and shaping operation of the shutter assembly 7 in the third embodiment.

In a first step, six shutter members 15 are moved in the horizontal direction to close the central opening 9 until an indentation is formed by the edges 17a of the cutting surfaces 17 of the shutter members 15 at the bottom center of the shutter assembly 7. Then, in a second step, six shutter members 15 are further moved in the same direction until the indentation formed at the bottom center of the shutter assembly 7 disappears. Thereby, the bottom center of the shutter assembly 7 becomes flat. Also, an indentation is formed at the top center of the shutter assembly 7.

By this two-step cutting and shaping operation, even very sticky food material can be completely cut and formed.

By repeating these operations, a plurality of food products WA can be manufactured. These food products WA are fed to the next operation by means of a conveyor 13.

Next, we will explain the drive mechanism to synchronously rotate six shutter members 15 in the horizontal direction to open and close the central opening 9, and the drive mechanism to lower and raise the shutter assembly 7.

Figure 5:
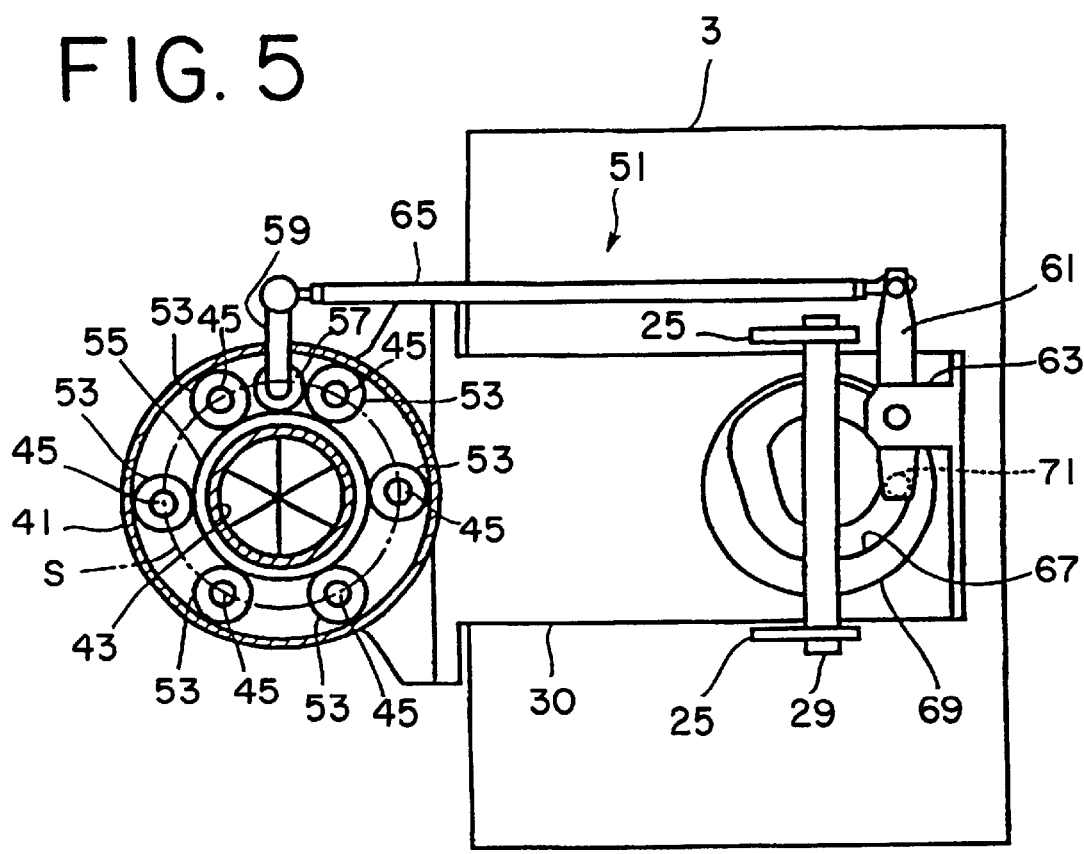
FIG. 5 is a plan view of the apparatus for cutting and shaping the bar-shaped food material.
Figure 6:
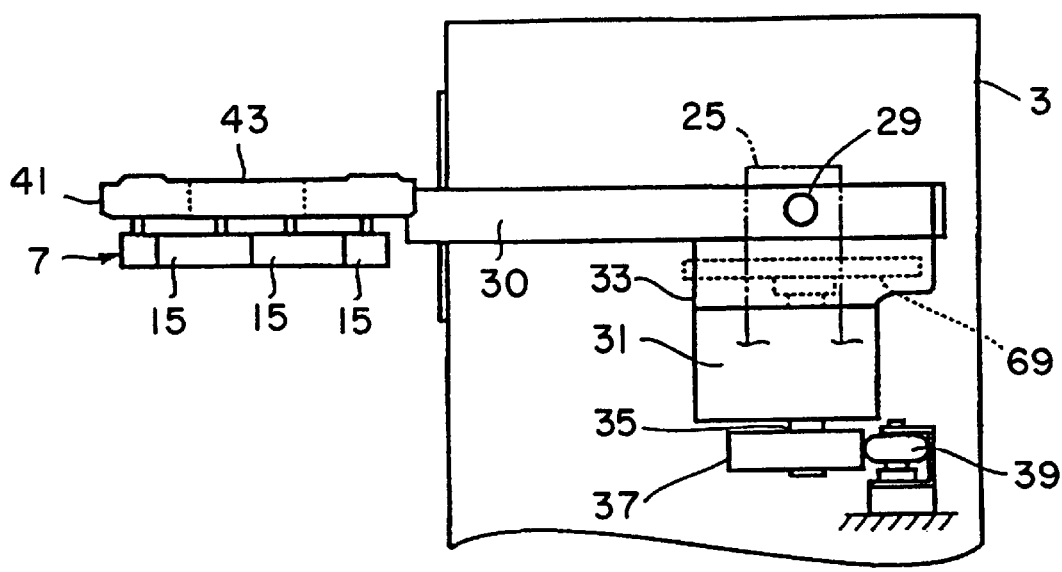
FIG. 6 is a schematic side view of the apparatus for cutting and shaping the bar-shaped food material.
Figure 7A:
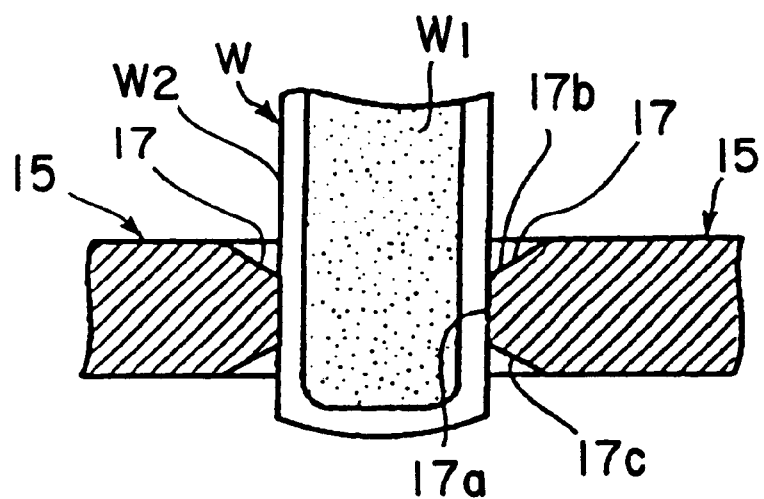
FIGS. 7(*a*) and 7(*b*) are plans showing the function of the shutter assembly in the first embodiment in the process of closing the central opening.
Figure 7B:
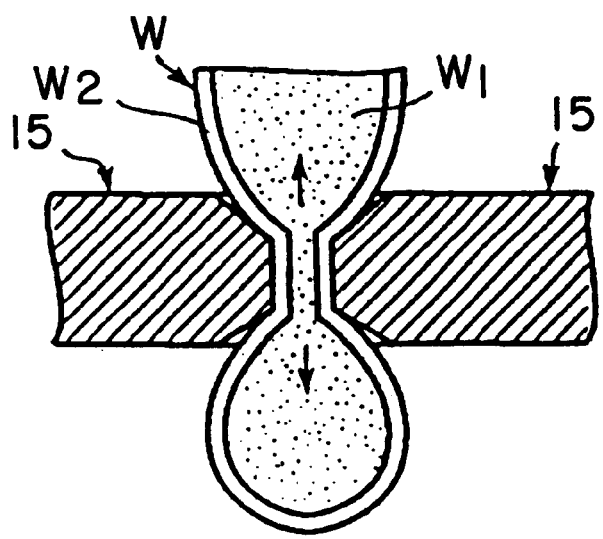

As shown in FIGS. 4–6, a pair of fixed members 25 are fixed on the frame 3, and a supporting frame 30 is disposed between the fixed members 25 so that the supporting frame 30 moves up and down by means of a rotating shaft 29. A motor 31, disposed under the supporting frame 30 through a bracket 33, moves the supporting frame 30 up and down. A cam roller 37, connected to the motor 31 through a motor shaft 35, contacts a contacting roller 39 due to gravity acting on the supporting frame 30.

As shown in FIGS. 5 and 6, a case 41, provided with an entrance 43 through which the food material W can pass, is connected at the end of the supporting frame 30. The case 41 is connected to the shutter assembly 7 through the six shafts 45.

As shown in FIGS. 1–3, a long hole 49 is provided in each shutter member 15 parallel to the cutting surface 17 of the shutter member 15, and a rotating member 47 is attached to each shaft 45, so that the shutter member 15 can be moved in the horizontal direction through the long hole 49 by the rotation of the rotating member 47. As another embodiment, a sliding member is provided in each shutter member 15, and a guide member is provided in each shaft 45, so that the shutter member 15 can be moved in the horizontal direction through the sliding member.

As shown in FIG. 5, a driving means 51 is disposed so that six shafts 45 can be synchronously rotated. Specifically, in the case 41, a ring gear 55 is engaged with six gears 53 connected to each rotating shaft 45. A driving gear 57, disposed at the end of an arm 59, is engaged with the ring gear 55. At the other end of the supporting frame 30 a driving arm 61 is attached to a bracket 63. One end of the rod 65 is connected to the arm 59, and the other end of the rod 65 is connected to the driving arm 61. A cam plate 69, provided with a cam groove 67, is mounted on the motor shaft 35. A cam follower 71, connected to the driving arm 61, is engaged with the cam groove 67. The cam roller 37 and cam groove 67 are shaped such that the supporting frame 30 is moved downward when the six shutter members 15 are moved in the horizontal direction to close the central opening 9, and the supporting frame 30 is moved upward when the six shutter members 15 are moved in the horizontal direction to open the central opening 9.

By this mechanism, the force of the rotation of the cam plate 69 by the rotary drive of the motor 31 is transmitted to the driving gear 57 through the driving arm 61, rod 65, and arm 59 by means of the cam groove 67. Also, the force of the rotation of the driving gear 57 is transmitted to the six shafts 45 through the ring gear 55 and the gears 53. The force of the synchronous rotation of the six shafts 45 in one direction is transmitted to the six shutter members 15 in the horizontal direction to close the central opening 9. In contrast, the force of the synchronous rotation of the six shafts 45 in the other direction is transmitted to the six shutter members 15 in the horizontal direction to open the central opening 9.

When the six shutter members 15 are rotated in the horizontal direction to close the central opening 9, the supporting frame 30 is moved downward through the shaft 29 by means of the cam roller 37. Thereby, the six shutter members 15 are moved downward with the case 41. In contrast, when the six shutter members are moved in the horizontal direction to open the central opening 9, the supporting frame 30 is moved upward through the rotating shaft 29 by means of the cam roller 37. Thereby, the six shutter members 15 are moved upward with the case 41.

As shown in FIG. 4, the conveyor 13 is provided with a belt-supporting member 73 supporting the part of the conveyor belt that can be moved up and down. By raising the belt-supporting member 73, the food material W is prevented from dropping due to its own weight during the cutting and shaping operation.

In this embodiment of the drive mechanism, every shaft is a drive shaft that is synchronously rotated by the driving means for synchronously rotating every shutter member. However, alternatively, in another embodiment of the drive mechanism, at least one shaft may be a drive shaft that is rotated by the driving means for rotating a shutter member in the horizontal direction to open and close the central opening, so that the force of the rotation of a shutter member is transmitted to the adjacent shutter member.

Also, in this embodiment of the drive mechanism, the shutter member is moved by the force of the rotation of the shaft. However, alternatively, the shutter member may be moved by means of a cylinder.

Effects of Invention

As described above, this invention has the following effects:

Since in this invention each shutter member is provided with a shaft, each shutter member can independently be moved in the horizontal direction without being prevented from doing so by the movement of the adjacent shutter members.

Since this invention has a holding member that bridges and holds two adjacent shutter members, the shutter members are prevented from being separated when they are rotated by the rotation of the shafts.

Since this invention has no housing to hold the shutter assembly, the shutter assembly will not be clogged when the shutter members are expanded by heat generated during the cutting and shaping operation.

Also, since in this invention each shutter member has a cutting surface and a sliding surface abutting each other, the accuracy of the dimensions of these two surfaces needs to be very high. Therefore, the processing cost of this apparatus becomes low, compared with that of the conventional apparatus wherein each shutter member has three surfaces.

Since in this invention there are two steps in closing the central opening, the ability to cut the crust by closing the central opening improves. Thereby, even very sticky food material can be completely cut and shaped. Also, in the first and second embodiments, as shown in FIGS. 8(*b*) and 14(*b*), since the top center of the shutter assembly becomes flat at the end of the second step, wherein the central opening is closed, a bottom crust of a food product that is next to be cut and shaped can be made to be flat. Thus, food products free from disfigured surfaces can be produced.

Since the six shutter members are also moved in the downward direction when they are moved in the horizontal direction to close the central opening, the food material can be smoothly fed in the downward direction without stopping at the top surface of the shutter assembly.

What is claimed is:

1. A method for continuously cutting and shaping a spherical food product from bar-shaped food material consisting of a filling and a crust, comprising the steps of:

rotating synchronously at least three shutter members each having a cutting surface, in a first direction about an at least substantially vertical shaft, none of the shutter members being fixedly associated with the shaft, so as to close a central opening through which the food material is passing until an indentation is formed by the gathering of parts of the shutter members at the centers of the top and bottom thereof, thereby cutting and shaping the food material, and further rotating the shutter members in the first direction until the indentation formed at the centers of the top and bottom of the shutter assembly disappears, thereby causing the centers of the top and bottom of the shutter assembly to become flat, and forming a hollow section in the center of the shutter assembly and between the top surface and the bottom surface of the shutter members, thereby further cutting and shaping the food material to produce the food product.

2. A method for continuously cutting and shaping, from bar-shaped food material consisting of a filling and a crust, a food product consisting of a filling and a crust, wherein the top part of the product is devoid of a crust so that the filling is exposed at its top, comprising the steps of:

rotating synchronously at least three shutter members each having a cutting surface, in a first direction about an at least substantially vertical shaft, none of the shutter members being fixedly associated with the shaft, so as to close a central opening through which the food material is passing until an indentation is formed by the gathering of parts of the shutter members at the center of the top thereof, thereby cutting and shaping the food material, and further rotating the shutter members in the first direction until the indentation formed at the center of the top of the shutter assembly disappears, thereby causing the center of the top of the shutter assembly to become flat, and forming another indentation at the center of the bottom of the shutter assembly, thereby further cutting and shaping the food material to produce the food product.

3. A method for continuously cutting and shaping, from bar-shaped food material consisting of a filling and a crust, a food product consisting of a filling and a crust, wherein the bottom part of the product is devoid of a crust so that the filling is exposed at its bottom, comprising the steps of:

rotating synchronously at least three shutter members each having a cutting surface, in a first direction about an at least substantially vertical shaft, none of the shutter members being fixedly associated with the shaft, so as to close a central opening through which the food material is passing until an indentation is formed by the gathering of parts of the shutter members at the center of the bottom thereof, thereby cutting and shaping the food material, and further rotating the shutter members in the first direction until the indentation formed at the center of the bottom of the shutter assembly disappears, thereby causing the center of the bottom of the shutter assembly to become flat, and forming another indentation at the center of the top of the shutter assembly, thereby further cutting and shaping the food material to produce the food product.

* * * * *